United States Patent
Imada et al.

(10) Patent No.: US 8,563,644 B2
(45) Date of Patent: Oct. 22, 2013

(54) NITRILE COPOLYMER RUBBER COMPOSITION AND NITRILE COPOLYMER LATEX COMPOSITION

(75) Inventors: Akira Imada, Tokyo (JP); Haruhiko Fujita, Tokyo (JP); Yoshiyuki Nakamura, Tokyo (JP)

(73) Assignee: Zeon Corporation, Tokyo (JP)

( * ) Notice: Subject to any disclaimer, the term of this patent is extended or adjusted under 35 U.S.C. 154(b) by 618 days.

(21) Appl. No.: 12/593,542

(22) PCT Filed: Mar. 28, 2008

(86) PCT No.: PCT/JP2008/056041
§ 371 (c)(1),
(2), (4) Date: Sep. 28, 2009

(87) PCT Pub. No.: WO2008/123405
PCT Pub. Date: Oct. 16, 2008

(65) Prior Publication Data
US 2010/0104789 A1    Apr. 29, 2010

(30) Foreign Application Priority Data

Mar. 29, 2007 (JP) ................................. 2007-086596

(51) Int. Cl.
*C08K 3/34* (2006.01)
(52) U.S. Cl.
USPC ......................................... 524/446; 524/555

(58) Field of Classification Search
USPC .................................................. 524/555, 446
See application file for complete search history.

(56) References Cited

U.S. PATENT DOCUMENTS

| 3,926,889 | A | * | 12/1975 | Duchesneau et al. | .......... 523/300 |
| 6,498,223 | B2 | * | 12/2002 | Sakata et al. | .................. 526/338 |
| 2002/0068805 | A1 | | 6/2002 | Futami et al. | |

FOREIGN PATENT DOCUMENTS

| EP | 0 402 991 A1 | 12/1990 |
| JP | 3-50248 A | 3/1991 |
| JP | 8-231769 A | 9/1996 |
| JP | 2001-214069 A | 8/2001 |
| JP | 2005-206645 A | 8/2005 |
| WO | WO-2007/026707 A1 | 3/2007 |

* cited by examiner

*Primary Examiner* — Peter D Mulcahy
(74) *Attorney, Agent, or Firm* — Birch, Stewart, Kolasch & Birch, LLP

(57) ABSTRACT

A nitrile copolymer rubber composition obtained by coagulation of a nitrile copolymer latex composition comprised of a latex of a nitrile copolymer rubber (A) having α,β-ethylenically unsaturated nitrile monomer units in 55 to 80 wt % and cationic monomer units and/or monomer units able to form cations in which an inorganic filler (B) is dispersed is provided. Note that, preferably, the inorganic filler is a clay. According to the present invention, a nitrile copolymer rubber composition giving a nitrile copolymer rubber cross-linked product with an extremely low gasoline permeability and superior in sour gasoline resistance can be provided.

15 Claims, No Drawings

NITRILE COPOLYMER RUBBER COMPOSITION AND NITRILE COPOLYMER LATEX COMPOSITION

TECHNICAL FIELD

The present invention relates to a rubber composition giving a nitrile copolymer rubber cross-linked product with an extremely low gasoline permeability and superior sour gasoline resistance and to a latex composition giving that rubber composition.

BACKGROUND ART

Conventionally, rubber containing $\alpha,\beta$-ethylenically unsaturated nitrile monomer units and conjugated diene monomer units or olefin monomer units (nitrile copolymer rubber) has been known as rubber with superior oil resistance. Its cross-linked products are mainly used as fuel hoses, gaskets, packing, oil seals, and other various types of rubber products used around oil for automotive applications.

Recently, due to the increasing global activities for protection of the environment, efforts have been made to reduce the amount of evaporation of gasoline and other fuel into the atmosphere. In fuel hoses, seals, packing, and other applications, further lower gasoline permeability is required. Further, fuel hoses are required to have resistance to the free radicals produced in sour gasoline (sour gasoline resistance).

Under these circumstances, Patent Document 1 proposes to stir and mix various types of rubber latexes, montmorillonite suspensions, and montmorillonite dispersants (pyrophosphoric acid compounds etc.) at a high speed to disperse and mix clayey materials in the rubber latexes to improve the properties of the cross-linked products. However, with this method, the gas barrier property of the obtained cross-linked products is improved, but the gasoline permeability is not lowered.

Further, with just blending in flat particle clay promising the effect of blocking permeation of gasoline into extremely high nitrile rubber (in general, meaning nitrile rubber with an amount of nitrile of 43 to 50 wt %), since this clay lacks affinity with extremely high nitrile rubber and has difficulty in dispersing, the gasoline permeability and sour gasoline resistance are not sufficiently improved. Note that, in a nitrile rubber, if the amount of nitrile is high, the gasoline permeability is improved.

Furthermore, by treating clay to make it organic treatment by an organic onium compound or by another lipophilic treatment, the dispersability is improved, but while an extremely high nitrile rubber cross-linked product including such a lipophilically treated clay exhibits the effects of increased tensile strength and elongation and reduced compression set, the absorption of gasoline is increased and the gasoline permeability becomes large.

For this reason, a rubber cross-linked product with an extremely low gasoline permeability and superior sour gasoline resistance has been demanded.

Patent Document 1: Japanese Patent Publication (A) No. 2006-70137

DISCLOSURE OF THE INVENTION

Problem to be Solved by the Invention

An object of the present invention is to provide a rubber composition giving a nitrile copolymer rubber cross-linked product with an extremely low gasoline permeability and superior sour gasoline resistance and a latex composition giving that rubber composition.

Means for Solving the Problems

The inventors engaged in intensive studies and as a result discovered that (I) the above object cannot be achieved even if simply mixing (dry blending) a nitrile copolymer rubber containing cationic monomer units and/or monomer units able to form cations which has a greater amount of nitrile than extremely high nitrile rubber and an inorganic filler, but (II) the above object is achieved by using a rubber composition obtained by preparing a latex composition comprised of a latex of a nitrile copolymer rubber containing the above cationic monomer units and/or monomer units able to form cations into which an inorganic filler is dispersed and coagulating the latex composition and thereby completed the present invention.

That is, according to the present invention, the following are provided:

(1) A nitrile copolymer latex composition comprising a latex of a nitrile copolymer rubber (A) having $\alpha,\beta$-ethylenically unsaturated nitrile monomer units in 55 to 80 wt % and cationic monomer units and/or monomer units able to form cations into which an inorganic filler (B) is dispersed, (2) The nitrile copolymer latex composition as set forth above, wherein a plasticizer is further dispersed, (3) The nitrile copolymer latex composition as set forth above, wherein the inorganic filler (B) is clay, (4) The nitrile copolymer latex composition as set forth above, wherein a ratio of content of the cationic monomer units and/or monomer units able to form cations in the nitrile copolymer rubber (A) is 0.1 to 15 wt %, (5) The nitrile copolymer latex composition as set forth above, wherein a ratio of the inorganic filler (B) with respect to the nitrile copolymer rubber (A) as 100 parts by weight is 1 to 200 parts by weight, (6) The nitrile copolymer latex composition as set forth above, wherein the nitrile copolymer rubber (A) further has diene monomer units and/or $\alpha$-olefin monomer units, and a ratio of content of the diene monomer units and/or $\alpha$-olefin monomer units in the nitrile copolymer rubber (A) is 5 to 44.9 wt %, (7) A nitrile copolymer rubber composition obtained by coagulation of the nitrile copolymer latex composition as set forth above, (8) A cross-linkable nitrile copolymer rubber composition comprised of the nitrile copolymer rubber composition as set forth above to which a cross-linking agent is added, (9) A rubber cross-linked product obtained by cross-linking the cross-linkable nitrile copolymer rubber composition as set forth above,

(10) A laminate comprised of two or more layers wherein at least one layer is comprised of the rubber cross-linked product as set forth above,

(11) A hose obtained by shaping the cross-linkable nitrile copolymer rubber composition as set forth above into a tube shape, inserting a mandrel, and cross-linking the obtained shaped article, and

(12) A hose obtained by shaping a laminate of two or more layers including a layer comprised of the cross-linkable nitrile copolymer rubber composition as set forth above into a tube shape, inserting a mandrel, and cross-linking the obtained shaped article.

Effects of the Invention

According to the present invention, a rubber composition giving a nitrile copolymer rubber cross-linked product with an extremely low gasoline permeability and superior sour gasoline resistance and a latex composition giving the rubber composition are provided.

BEST MODE FOR CARRYING OUT THE INVENTION

The latex composition of the present invention comprises a latex of a nitrile copolymer rubber (A) having α,β-ethylenically unsaturated nitrile monomer units in 55 to 80 wt % and cationic monomer units and/or monomer units able to form cations into which an inorganic filler (B) is dispersed.

Nitrile Copolymer Rubber (A)

The nitrile copolymer rubber (A) used in the present invention has the α,β-ethylenically unsaturated nitrile monomer units in an amount of, with respect to the total monomer units, 55 to 80 wt %, preferably 56 to 76 wt %, more preferably 57 to 72 wt %. If the content of the α,β-ethylenically unsaturated nitrile monomer units is too small, the obtained rubber cross-linked product deteriorates in oil resistance and becomes greater in gasoline permeability. On the other hand, if the content of the α,β-ethylenically unsaturated nitrile monomer units is too great, the obtained rubber cross-linked product becomes higher in brittle temperature and falls in rubber elasticity so is no longer suitable as a rubber material.

The α,β-ethylenically unsaturated nitrile monomers forming the α,β-ethylenically unsaturated nitrile monomer units are not particularly limited so long as being α,β-ethylenically unsaturated compounds having nitrile groups. Acrylonitrile; α-chloroacrylonitrile, α-bromoacrylonitrile, or other α-halogenoacrylonitriles; methacrylonitrile or other α-alkylacrylonitriles; etc. may be mentioned. Among these as well, acrylonitrile and methacrylonitrile are preferred. A plurality of α,β-ethylenically unsaturated compounds having nitrile groups may also be used in combination.

Further, the nitrile copolymer rubber contains the cationic monomer units and/or monomer units able to form cations in an amount of, with respect to the total monomer units, preferably 0.1 to 15 wt %, more preferably 0.2 to 15 wt %, particularly preferably 0.3 to 10 wt %. If the amount of the cationic monomer units and/or monomer units able to form cations used is too small, the obtained rubber cross-linked product sometimes becomes larger in gasoline permeability. On the other hand, if the content of the cationic monomer units and/or monomer units able to form cations is too great, the obtained rubber cross-linked product may deteriorate in cold resistance.

The monomer forming the cationic monomer units and/or monomer units able to form cations may be any monomer forming monomer units charged to a plus state when the obtained polymer contacts water or an acid aqueous solution and is not particularly limited. As such a monomer, as a cationic monomer, monomers containing quaternary ammonium salt group may be mentioned. Further, as monomers able to form cations, monomers having precursor parts (substituent groups) such as tertiary amino groups cationated and forming ammonium salts (for example, amine hydrochloride or amine sulfate) when contacting acid aqueous solutions of hydrochloric acid, sulfuric acid, etc. may be mentioned.

As examples of monomers forming cationic monomer units, (meth)acryloyloxytrimethyl ammonium chloride (meaning acryloyloxytrimethyl ammonium chloride and/or methacryloyloxytrimethyl ammonium chloride, same below), (meth)acryloyloxyhydroxypropyltrimethyl ammonium chloride, (meth)acryloyloxytriethyl ammonium chloride, (meth)acryloyloxydimethylbenzyl ammonium chloride, (meth)acryloyloxytrimethyl ammonium methylsulfate, and other (meth)acrylic ester monomers containing quaternary ammonium salt group; (meth)acrylamidepropyltrimethyl ammonium chloride, (meth)acrylamidepropyldimethylbenzyl ammonium chloride, and other (meth)acrylamide monomers containing quaternary ammonium salt group; etc. may be mentioned.

As examples of monomers forming monomer units able to form cations, 2-vinylpyridine, 4-vinylpyridine, and other vinyl-group containing cyclic amine monomers; dimethylaminoethyl (meth)acrylate and other tertiary amino-group-containing (meth)acrylic ester monomers; dimethylaminoethyl (meth)acrylamide, N,N-dimethylaminopropyl acrylamide, and other tertiary amino-group containing (meth)acrylamide monomers; N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinyl benzyloxy)aniline, N-phenyl-4-(4-vinylbenzyloxy)aniline, etc. may be mentioned.

Among these monomers, since the present invention becomes much more remarkable in effect, a vinyl-group containing cyclic amine monomer, a tertiary amino-group containing (meth)acrylic ester monomer, and a tertiary amino-group containing (meth)acrylamide monomer are preferable, while a vinyl-group containing cyclic amine monomer and tertiary amino-group containing acrylamide monomer are particularly preferred. These may be used alone or in combinations of a plurality of types.

The nitrile copolymer rubber (A) preferably also contains diene monomer units and/or α-olefin monomer units so that the obtained cross-linked product has rubber elasticity. Note that when the above-mentioned "cationic monomer units and/or monomer units able to form cations" also correspond to the "diene monomer units and/or α-olefin monomer units", they are treated as "cationic monomer units and/or monomer units able to form cations".

As the diene monomer forming the diene monomer units, 1,3-butadiene, isoprene, 2,3-dimethyl-1,3-butadiene, 1,3-pentadiene, or other preferably C4 or higher conjugated dienes; 1,4-pentadiene, 1,4-hexadiene, or other preferably C5 to C12 nonconjugated dienes may be mentioned. Among these, a conjugated diene is preferable and 1,3-butadiene is more preferable.

As the α-olefin monomer forming the α-olefin monomer units, preferably one having 2 to 12 carbon atoms such as ethylene, propylene, 1-butene, 4-methyl-1-pentene, 1-hexene, 1-octene, etc. may be illustrated.

The content of the diene monomer units and/or α-olefin monomer units in the nitrile copolymer rubber (A) is, with respect to the total monomer units, preferably 5 to 44.9 wt %, more preferably 9 to 43.8 wt %, further preferably 18 to 42.7 wt %. If these monomer units are too small, the obtained rubber cross-linked product is liable to fall in rubber elasticity. On the other hand, if too large, the obtained rubber cross-linked product may be impaired in heat aging resistance or chemical stability.

The nitrile copolymer rubber (A) may also contain, in addition to the α,β-ethylenically unsaturated nitrile monomer units, cationic monomer units and/or monomer units able to form cations, and diene monomer units and/or α-olefin monomer units, units of another monomer able to copolymerize with the monomers forming these monomer units. The ratio of content of the other monomer units may be, with respect to the total monomer units, preferably 20 wt % or less, more preferably 10 wt % or less, particularly preferably 5 wt % or less.

As another copolymerizable monomer, for example, styrene, α-methylstyrene, vinyltoluene, or other aromatic vinyl compounds; fluoroethylvinyl ether, fluoropropylvinyl ether, o-trifluoromethyl styrene, vinyl pentafluorobenzoate, difluoroethylene, tetrafluoroethylene, or other fluorine-containing vinyl compounds; acrylic acid, methacrylic acid, maleic acid, maleic ankydride, itaconic acid, itaconic anhydride, fumaric acid, fumaric anhydride, or other α,β-ethylenically unsaturated carboxylic acids and their anhydrides; methyl (meth)acrylate, ethyl (meth)acrylate, butyl (meth)acrylate, 2-ethylhexyl (meth)acrylate, or other α,β-ethylenically unsaturated carboxylic acid alkyl esters; monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, dibutyl itaconate, or other mono esters or diesters of α,β-ethylenically unsaturated polyvalent carboxylic acids; methoxyethyl (meth)acrylate, methoxypropyl (meth)acrylate, butoxyethyl (meth)acrylate, or other alkoxyalkyl esters of α,β-ethylenically unsaturated carboxylic acids; 2-hydroxyethyl (meth)acrylate, 3-hydroxypropyl (meth)acrylate, or other hydroxyalkyl esters of α,β-ethylenically unsaturated carboxylic acids; divinylbenzene or other divinyl compounds; ethylene di(meth)acrylate, diethyleneglycol di(meth)acrylate, ethyleneglycol di(meth)acrylate, or other di(meth)acrylic esters; trimethylolpropane tri(meth)acrylate or other trimethacrylic esters; or other multifunctional ethylenically unsaturated monomers and also N-methylol (meth)acrylamide, N,N'-dimethylol (meth)acrylamide, or other self cross-linkable compounds; etc. may be mentioned.

The Mooney viscosity of the nitrile copolymer rubber (below, sometimes referred to as the "polymer Mooney viscosity") ($ML_{1+4}$, 100° C.) is preferably 15 to 250, more preferably 15 to 200, furthermore preferably 30 to 120, particularly preferably 45 to 100. If the nitrile copolymer rubber (A) is too low in polymer Mooney viscosity, the obtained rubber cross-linked product is liable to fall in strength properties. On the other hand, if too high, the workability in the case of making it into a nitrile copolymer rubber composition may fall.

Method of Production of Latex of Nitrile Copolymer Rubber (A)

The method of production of the latex of the nitrile copolymer rubber (A) is not particularly limited so long as it is a method enabling copolymerization of the monomers forming the nitrile copolymer rubber (A), but for example the emulsion polymerization method of using sodium dodecylbenzenesulfonate or another emulsifier to obtain a latex of a copolymer of an average particle size of about 50 to 1,000 nm and the suspension polymerization method (including also fine suspension polymerization method) of using polyvinyl alcohol or another dispersant to obtain a latex of a copolymer of an average particle size of about 0.2 to 200 μm may be suitably used. Among these, since control of the polymerization reaction is easy, the emulsion polymerization method is more preferable.

The emulsion polymerization method is preferably performed by the following routine when the nitrile copolymer rubber (A) is obtained by copolymerization of an α,β-ethylenically unsaturated nitrile monomer (below, sometimes referred to as the "monomer (m1)"), conjugated diene monomer (below, sometimes referred to as the "monomer (m2)"), and cationic monomer and/or monomer able to form cations (below, sometimes referred to as the "monomer (m3)").

That is, the method of polymerizing 100 parts by weight of a monomer mixture comprised of a monomer (m1) in 55 to 82 parts by weight, preferably 56 to 78 parts by weight, more preferably 57 to 74 parts by weight, a monomer (m2) in 3 to 44.9 parts by weight, preferably 7 to 43.8 parts by weight, more preferably 16 to 42.7 parts by weight, and a monomer (m3) in 0.1 to 15 parts by weight, preferably 0.2 to 15 parts by weight, more preferably 0.3 to 10 parts by weight (where the total amount of monomer (m1), monomer (m2), and monomer (m3) is 100 parts by weight) by emulsion polymerization, stopping the polymerization reaction at the time when the polymerization conversion rate is preferably 50 to 95 wt %, then if desired removing the unreacted monomer is preferred.

If the amount of use of the monomer (m1) is too small, the content of the acrylonitrile monomer units becomes low. On the other hand, if too large, the reaction loses activity at the initial stage of polymerization.

If the amount of use of the monomer (m2) is too small, the reaction loses activity at the initial stage of polymerization. On the other hand, if too large, the gasoline permeability becomes larger.

If the amount of use of the monomer (m3) is too small, the dispersability of the inorganic filler deteriorates. On the other hand, if too large, the cold resistance deteriorates.

If the polymerization conversion rate for stopping the polymerization reaction is too low, recovery of the unreacted monomer becomes extremely difficult, while conversely if too high, the normal physical properties deteriorate.

Note that when performing emulsion polymerization, it is possible to suitably use an emulsifier, polymerization initiator, secondary polymerization material, etc. known in the past in the field of emulsion polymerization. The polymerization temperature and polymerization time may also be suitably adjusted.

From the point to control the distribution of composition of the monomer units of the copolymer formed and to obtain a rubber cross-linked product rich in rubber elasticity, it is preferable to start the polymerization reaction, then add at least part of the monomer (m2) to the reactor for polymerization. This is because in general the monomer (m2) has a higher polymerization reactivity compared with the other monomers, so the monomer (m2) is consumed faster and the copolymerization reaction would become harder to proceed or the distribution of composition of the copolymer would become broader.

In this case, it is preferable to charge a monomer mixture comprised of preferably 80 wt % or more of the monomer (m1) used for polymerization, more preferably 90 wt % or more, particularly preferably the entire amount, preferably 5 to 50 wt % of the monomer (m2) used for polymerization, more preferably 10 to 40 wt %, particularly preferably 15 to 30 wt %, and preferably 0 to 100 wt % of the monomer (m3) used for polymerization, more preferably 50 wt % or more, particularly preferably the entire amount into a reactor, starting the polymerization reaction, then adding the remaining monomers to the reactor and continuing the polymerization reaction with the polymerization conversion rate of the monomer mixture charged into the reactor preferably in the range of 5 to 80 wt %.

The method of adding the remaining monomers is not particularly limited, but they may be added all together, may be added in batches, and further may be added continuously. From the viewpoint of the ability to more simply control the distribution of composition of the copolymer, it is preferable to add the remaining monomers in batches. It is particularly preferable to add it divided into three to four batches. When adding the remaining monomers in batches, the amounts of the monomers added in the batches and the timings of addition in the batches may be adjusted in accordance with the progress in the polymerization reaction to obtain the desired copolymer.

Below, the specific method of polymerization by adding the remaining monomers in four batches will be shown.

(First Stage Polymerization)

A monomer mixture comprised of the total amount of the monomer (m1) used for the polymerization, 15 to 30 wt % of the monomer (m2) used for the polymerization, and the total amount of the monomer (m3) used for the polymerization is charged into the reactor and the polymerization reaction is started.

(Second Stage Polymerization)

After the first stage polymerization, with the polymerization conversion rate of the monomer mixture charged into the reactor preferably in the range of 20 to 40 wt %, 15 to 25 wt % of the monomer (m2) used for the polymerization is added to the reactor and the polymerization reaction is continued.

(Third Stage Polymerization)

After the second stage polymerization, with the polymerization conversion rate of the monomer mixture charged into the reactor preferably in the range of 40 to 55 wt %, 15 to 25 wt % of the monomer (m2) used for the polymerization is added to the reactor and the polymerization reaction is continued.

(Fourth Stage Polymerization)

After the third stage polymerization, with the polymerization conversion rate of the monomer mixture charged into the reactor preferably in the range of 55 to 65 wt %, 15 to 20 wt % of the monomer (m2) used for the polymerization is added to the reactor and the polymerization reaction is continued.

(Fifth Stage Polymerization)

After the fourth stage polymerization, with the polymerization conversion rate of the monomer mixture charged into the reactor preferably in the range of 65 to 75 wt %, the remaining monomer (m2) is added to the reactor and the polymerization reaction is continued.

(End of Polymerization Reaction and Post-Treatment)

After the fifth stage polymerization, with the polymerization conversion rate of the monomer mixture charged into the reactor preferably in the range of 75 to 85 wt %, a polymerization terminator is added to stop the polymerization reaction.

After this, if desired, by using heat distillation, reduced pressure distillation, steam distillation, or another known method to remove unreacted monomers, a latex of a nitrile copolymer rubber (A) is obtained.

The latex of the nitrile copolymer rubber (A) obtained by the emulsion polymerization method has a solid concentration of preferably 5 to 70 wt %, more preferably 10 to 60 wt %.

Note that the nitrile copolymer rubber (A) may also be obtained by hydrogenation of the unsaturated bond parts in the diene monomer units of the copolymer obtained by copolymerization in the above way (hydrogenation reaction). The method of hydrogenation is not particularly limited, but a known method may be employed.

Nitrile Copolymer Latex Composition

The nitrile copolymer latex composition of the present invention (below, sometimes referred to as the "latex composition I") is comprised of a latex of the above nitrile copolymer rubber (A) in which an inorganic filler (B) is dispersed.

The inorganic filler (B) is not limited so long as it is one used as an inorganic filler, reinforcing agent, etc. in usual rubber processing. Calcium carbonate (including light calcium carbonate and ultrafine activated calcium carbonate), basic magnesium carbonate, silicic anhydride, hydrous silicic acid, clay (meaning natural mineral mainly comprised of hydrous aluminum silicate such as montmorillonite, pyrophyllite, kaolinite, halloysite, sericite, etc.), magnesium silicate (talc), calcium silicate (wollastonite), magnesium hydroxide, aluminum hydroxide, barium sulfate (barite), etc. may be mentioned.

Among these as well, clay is preferred. Clay has a flat particle shape. Due to this, the obtained rubber cross-linked product may be given the effect of blocking permeation of gasoline due to the flat particle shape. Furthermore, clay is a multilayer structure having exchangeable positive ions between the layers, so is superior in dispersion in a nitrile copolymer rubber (A) having cationic monomer units and/or monomer units able to form cations. Due to this, for the above reasons, clay is preferred.

The average particle size of the inorganic filler (B) is preferably 0.001 to 20 μm, more preferably 0.01 to 15 μm, particularly preferably 0.1 to 10 μm. If the particle size of the inorganic filler (B) is too small, the rubber cross-linked product is liable to fall in mechanical strength. On the other hand, if too large, it might not be possible to prepare a stable latex composition. Note that the average particle size of the inorganic filler (B) can be determined by for example measuring the particle size distribution by the X-ray transmission method and finding the 50% volume cumulative size.

The amount of use of the inorganic filler (B) is, with respect to the nitrile copolymer rubber (A) as 100 parts by weight, preferably 1 to 200 parts by weight, more preferably 2 to 150 parts by weight, particularly preferably 3 to 120 parts by weight. If the amount of use of the inorganic filler (B) is too small, the obtained rubber cross-linked product is liable to become greater in gasoline permeability and the sour gasoline resistance to become insufficient. On the other hand, if the amount of use is too great, the dispersion of the inorganic filler (B) may become insufficient.

To prepare a latex composition I, the method of adding to a latex of the nitrile copolymer rubber (A) an aqueous dispersion of the inorganic filler (B) while stirring is preferred. Due to this, it is possible to obtain a latex composition I in which the two are uniformly mixed and dispersed.

Further, the aqueous dispersion of the inorganic filler (B) may be prepared by adding the inorganic filler (B) while strongly stirring an aqueous medium containing sodium polyacrylate, sodium tripolyphosphate, sodium hexametaphosphate, or another dispersant in an amount of 0.1 to 5.0 wt % of the inorganic filler (B). The solid concentration of the aqueous dispersion of the inorganic filler (B) is preferably 1 to 50 wt %, more preferably 2 to 40 wt %.

The latex composition I of the present invention preferably further has a plasticizer dispersed in it (the latex composition I in which a plasticizer is further dispersed will sometimes be referred to as the "latex composition II"). As the plasticizer, one used in the past as a plasticizer for rubber formulations may be used without restriction. For example, dibutoxyethyl adipate, di(butoxyethoxyethyl)adipate (SP value: 9.2), and other ester compounds of adipic acid and an ether-bond containing alcohol; dibutoxyethyl azelate, di(butoxyethoxyethyl)azelate, and other ester compounds of azelaic acid and an ether-bond containing alcohol; dibutoxyethyl sebacate, di(butoxyethoxyethyl)sebacate, and other ester compounds of sebacic acid and an ether-bond containing alcohol; dibutoxyethyl phthalate, di(butoxyethoxyethyl)phthalate, and other ester compounds of phthalic acid and an ether-bond containing alcohol; dibutoxyethyl isophthalate, di(butoxyethoxyethyl)isophthalate, and other ester compounds of isophthalic acid and an ether-bond containing alcohol; di-(2-ethylhexyl)adipate, diisodecyl adipate, diisononyl adipate, and other adipic acid dialkyl esters; di-(2-ethylhexyl) azelate (SP value: 8.5), diisooctyl azelate, di-n-hexyl azelate, and other azelaic acid dialkyl esters; di-n-butyl sebacate (SP value: 8.7), di-(2-ethylhexyl) sebacate (SP value: 8.4), or other sebacic acid dialkyl esters; dibutyl phthalate (SP value: 9.4), di-(2-ethylhexyl) phthalate (SP value: 9.0), di-n-octyl phthalate, diisobutyl phthalate, diheptyl phthalate (SP value: 9.0), diisodecyl phthalate (SP value: 8.5), diundecyl phthalate, dinonyl phthalate, and other phthalic acid dialkylesters; dicyclohexyl phthalate and other phthalic acid dicycloalkyl esters; diphenyl phthalate, butylbenzyl phthalate (SP value: 10.2), and other phthalic acid aryl esters; di-(2-ethylhexyl) isophthalate, diisooctyl isophthalate, and other isophthalic acid dialkyl esters; di-(2-ethylhexyl)tetrahydrophthalate, di-n-octyl tetrahydrophthalate, diisodecyl tetrahydrophthalate, and other tetrahydrophthalic acid dialkyl esters; tri-(2-ethylhexyl)trimellitate (SP value: 8.9), tri-n-octyl trimellitate (SP value: 8.9), triisodecyl trimellitate (SP value: 8.4), tri-isooctyl trimellitate, tri-n-hexyl trimellitate, tri-isononyl trimellitate (SP value: 8.8), and other trimellitic acid derivatives; etc. may be mentioned. These may be used alone or in combinations of a plurality of types.

Among these, since it is possible to make the obtained cross-linked product excellent in brittle temperature, one with an SP value by the HOY method of 8 to 10.2 $(cal/cm^3)^{1/2}$ is preferable. An ester compound of adipic acid, azelaic acid, sebacic acid, phthalic acid, or another dibasic acid and an ether-bond containing alcohol is more preferable. An ester compound of adipic acid and an ether-bond containing alcohol is furthermore preferable. Di(butoxyethoxyethyl)adipate is particularly preferable.

The content of the plasticizer in the latex composition II of the present invention is, with respect to the nitrile copolymer rubber (A) as 100 parts by weight, preferably 0.1 to 100 parts by weight, more preferably 1 to 100 parts by weight, particularly preferably 5 to 80 parts by weight. If the content of these plasticizers is too small, the obtained rubber cross-linked product is liable to become too high in brittle temperature. On the other hand, if too large, the obtained rubber cross-linked product may bleed.

The method of dispersing a plasticizer in the latex composition I of the present invention to obtain the latex composition II is not particularly limited, but the method of adding an aqueous dispersion of the plasticizer (emulsion) in the latex composition I while stirring is preferable. Due to this, a latex composition II comprising the nitrile copolymer rubber (A), inorganic filler (B), and plasticizer uniformly mixed and dispersed can be produced.

Further, the method of preparation of the aqueous dispersion of the plasticizer is not particularly limited but it is prepared by adding the plasticizer while strongly stirring an aqueous medium containing an anionic surfactant (potassium oleate, sodium dodecylbenzene sulfonate, etc.) in an amount of 0.5 to 10 wt % of the plasticizer. The concentration of plasticizer in the aqueous dispersion of the plasticizer is preferably 5 to 60 wt %.

The latex compositions I and/or II of the present invention may further have an acryl-based resin and/or vinyl chloride-based resin dispersed in them. When dispersing an acryl-based resin and/or vinyl chloride-based resin, if coagulating the latex composition to obtain a nitrile copolymer rubber composition and cross-linking the composition to obtain a rubber cross-linked product, it is possible to make the obtained rubber cross-linked product more improved in ozone resistance.

Nitrile Copolymer Rubber Composition and Cross-Linkable Nitrile Copolymer Rubber Composition The nitrile copolymer rubber composition of the present invention is obtained by coagulating any of the above latex composition I or II and washing and drying it in accordance with need.

To coagulate the above latex composition I or II, it is preferable to add the latex composition I or II to an aqueous solution containing an amount of calcium chloride, sodium chloride, calcium hydroxide, aluminum sulfate, aluminum hydroxide, or another coagulant of 0.5 to 20 by weight with respect to the amount of the nitrile copolymer rubber (A) for salting out.

Here, when adding the latex composition I or II for salting out, it is preferable to add a dilute sulfuric acid aqueous solution etc. to control the pH of the coagulant aqueous solution to the isoelectric point or less of the latex composition I or II. Due to this, the zeta potential of the functional groups of the cationic monomer units and monomer units able to form cations contained in the nitrile copolymer rubber (A) can rise, the dispersability of the inorganic filler (B) can be improved, and the size of the crumbs obtained by the coagulation can be made larger.

In general, the crumb size has a large effect on the degree of dewatering at the vibrating screen or squeezer after the coagulation and washing step, the crumb recovery rate, and furthermore the degree of dryness in the drying step. For example, if the crumb size is too small, at the vibrating screen etc., the crumbs will be flushed out from the mesh of the screen or the polymer will be insufficiently squeezed by the squeezer and the degree of dewatering will fall resulting in a drop in productivity. For this reason, a crumb size of 1 to 20 mm able to be recovered by a 20 mesh wire net (JIS Z8801, aperture dimension of 0.84 mm) is preferred (for method of measurement of crumb size, see examples).

Regarding the method of washing, dewatering, and drying the crumbs, the same method as the method of washing and dewatering and the method of drying in the production of general rubber can be used. As the washing and dewatering method, a net-like filter, centrifugal separator, etc. may be used to separate the crumbs obtained by coagulation and the water, the crumbs washed, and a squeezer etc., used to dewater the crumbs. Next, in general, a band drier, ventilating vertical dryer, twin-screw extruder, etc. used for the production of rubber may be used to dry the crumbs until a predetermined moisture content rate so as to obtain the nitrile copolymer rubber composition of the present invention. Further, the latex may be simultaneously coagulated and dried in a twin-screw extruder.

Further, in the present invention, the composition may be obtained by introducing into the latex of the nitrile copolymer rubber (A) the total amount or part of all of one or more of the inorganic filler (B), plasticizer, and acryl-based resin and/or vinyl chloride-based resin, then coagulating and drying the result and kneading with the remaining ingredients by a roll, Banbury mixer, or other mixer. Alternatively, it may be obtained by coagulating and drying the latex of the nitrile copolymer rubber (A) and kneading into the obtained rubber composition the inorganic filler (B), plasticizer, and acryl-based resin and/or vinyl chloride-based resin by a roll, Bambury mixer, or other mixer.

The thus obtained nitrile copolymer rubber composition has a Mooney viscosity of preferably 5 to 300, more preferably 5 to 180, furthermore preferably 5 to 120, particularly preferably 15 to 110.

The cross-linkable nitrile copolymer rubber composition of the present invention is comprised of the nitrile copolymer rubber composition obtained by the above method to which a cross-linking agent has been added.

The cross-linking agent is not limited so long as it is one usually used as a cross-linking agent for a nitrile-group containing copolymer rubber. As typical cross-linking agents, sulfur-based cross-linking agents or organic peroxide cross-linking agents cross-linking unsaturated bonds of the nitrile copolymer rubber (A) may be mentioned. These may be used together. Among these as well, sulfur-based cross-linking agents are preferred.

As the sulfur-based cross-linking agent, sulfur powder, flowers of sulfur, precipitated sulfur, colloid sulfur, surface treated sulfur, insoluble sulfur, or other sulfur; sulfur chloride, sulfur dichloride, morpholine disulfide, alkylphenol disulfide, dibenzothiazyl disulfide, N,N'-dithio-bis(hexahydro-2H-azepinone-2), phosphorus-containing polysulfide and polymer polysulfide and other sulfur-containing compounds; tetramethyl thiuram disulfide, selenium dimethyl dithiocarbamate, 2-(4'-morpholinodithio)benzothiazole, or other sulfur donor compounds etc. may be mentioned. These may be used alone or in combinations of a plurality of types.

As the organic peroxide cross-linking agent, for example, dicumyl peroxide, cumen hydroperoxide, t-butylcumyl peroxide, paramenthane hydroperoxide, di-t-butylperoxide, 1,3- and 1,4-bis(t-butylperoxyisopropyl)benzene, 1,1-di-t-butylperoxy-3,3-trimethylcyclohexane, 4,4-bis-(t-butyl-peroxy)-n-butylvalerate, 2,5-dimethyl-2,5-di-t-butylperoxyhexane, 2,5-dimethyl-2,5-di-t-butylperoxyhexine-3, 1,1-di-t-butylperoxy-3,5,5-trimethylcyclohexane, p-chlorobenzoyl peroxide, t-butylperoxyisopropyl carbonate, t-butylperoxy benzoate, etc. may be mentioned. These may be used alone or in combinations of a plurality of types.

The content of the cross-linking agent in the cross-linkable nitrile copolymer rubber composition of the present invention is not particularly limited, but is preferably, with respect to the nitrile copolymer rubber as 100 parts by weight, 0.1 to 10 parts by weight, more preferably 0.2 to 5 parts by weight.

When using an organic peroxide cross-linking agent, as a cross-linking aid, trimethylolpropane trimethacrylate, divinylbenzene, ethylene dimethacrylate, triallyl isocyanurate, or another polyfunctional monomer etc. may be used together. The amounts of these cross-linking aids are not particularly limited, but are preferably 0.5 to 20 parts by weight in range with respect to the nitrile copolymer rubber (A) as 100 parts by weight.

Further, when using a sulfur-based cross-linking agent, zinc oxide, stearic acid, or another cross-linking aid; a guanidine-based, aldehyde-amine-based, aldehyde-ammonia-based, thiazole-based, sulfenamide-based, thiourea-based, or other cross-linking accelerator can be used together. The amounts of these cross-linking aids and cross-linking accelerators are also not particularly limited. They are preferably 0.1 to 10 parts by weight in range with respect to the nitrile copolymer rubber (A) as 100 parts by weight.

The nitrile copolymer rubber composition or cross-linkable nitrile copolymer rubber composition of the present invention may also have blended into it, in accordance with need, a cross-linking retardant, antiaging agent, filler, reinforcing agent, lubricant, adhesive, lubricating agent, flame retardant, anti-fungal agent, anti-static agent, coloring agent, coupling agent, or other additive may also be blended. Further, it may have blended into it a working aid, plasticizer, etc.

As the antiaging agent, a phenol-based, amine-based, benzimidazole-based, phosphoric acid-based, or other antiaging agent can be used. Among phenol-based ones, 2,2'-methylene bis(4-methyl-6-t-butylphenol) etc. may be mentioned, among amine-based ones, 4,4'-bis($\alpha,\alpha$-dimethylbenzyl)diphenylamine, N-isopropyl-N'-phenyl-p-phenylene diamine, etc. may be mentioned, and among benzimidazole-based ones, 2-mercaptobenzimidazole etc. may be mentioned. These may be used alone or in combinations of a plurality of types.

As the filler, for example carbon black, silica, calcium carbonate, aluminum silicate, magnesium silicate, calcium silicate, magnesium oxide, staple fiber, zinc (meth)acrylate, magnesium (meth)acrylate, or another $\alpha,\beta$-ethylene-based unsaturated carboxylic acid metal salt etc. may be used. These fillers may also be used after a coupling treatment by a silane coupling agent, titanium coupling agent, etc. or a surface modification treatment by a higher fatty acid, its metal salt, its ester, its amide or other higher fatty acid derivative, or surfactant, etc.

Further, the nitrile copolymer latex composition, nitrile copolymer rubber composition, and cross-linkable nitrile copolymer rubber composition of the present invention may contain a rubber other than the nitrile copolymer rubber (A) in a range not detracting from the effect of the present invention. The rubber other than the nitrile copolymer rubber (A) is not particularly limited, but acryl rubber, ethylene-acrylic acid copolymer rubber, fluorine rubber, styrene-butadiene copolymer rubber, ethylene-propylene copolymer rubber, ethylene-propylene-diene ternary copolymer rubber, natural rubber, polyisoprene rubber, etc. may be mentioned.

Note that, the amount of the rubber other than the nitrile copolymer rubber (A) is, with respect to the nitrile copolymer rubber (A) as 100 parts by weight, preferably 100 parts by weight or less, more preferably 30 parts by weight or less, furthermore preferably 15 parts by weight or less, particularly preferably 5 parts by weight or less.

The cross-linkable nitrile copolymer rubber composition of the present invention has a Mooney viscosity (below, sometimes referred to as the "compound Mooney viscosity") ($ML_{1+4}$, 100° C.) of preferably 5 to 250, more preferably 5 to 150, furthermore preferably 5 to 120, particularly preferably 15 to 110.

Rubber Cross-Linked Product

The rubber cross-linked product of the present invention is obtained by cross-linking the above cross-linkable nitrile copolymer rubber composition.

To cross-link the cross-linkable nitrile copolymer rubber composition of the present invention, it is shaped by a shaping machine corresponding to the shape of the shaped article (rubber cross-linked product) to be obtained, for example, an extruder, injection molding machine, press, roll, etc., then cross-linked by a reaction to fix the shape of the cross-linked product.

At the time of cross-linking, it is possible to shape the composition in advance, then cross-link it or cross-link it simultaneously with the shaping operation. The shaping temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 1 hour.

Further, depending on its shape, size, etc., the rubber cross-linked product sometimes is cross-linked at its surface, but is not sufficiently cross-linked at its inside, so the product may be further heated for secondary cross-linking.

The thus obtained rubber cross-linked product of the present invention is small in gasoline permeability. For example, the gasoline permeability measured by the aluminum cup method (see test methods of later mentioned examples) using gasohol (mixture of gasoline and alcohol, corresponding to CE-20 of later mentioned examples) having a volume ratio of isooctane/toluene/methanol of 40/40/20 is preferably 200 g·mm/m$^2$·day or less, more preferably 100 g·mm/m$^2$·day or less, particularly preferably 60 g·mm/m$^2$·day or less.

Further, the rubber cross-linked product of the present invention has a high sour gasoline resistance. For example, it is preferable that no cracks can be observed in a test piece after 500 hours in a sour gasoline resistance test (see test methods of later mentioned examples) using fuel oil in which dilauroyl peroxide is dissolved in 3 wt % as a solution corresponding to degraded gasoline.

The rubber cross-linked product of the present invention has an brittle temperature by JIS K6301 of preferably −50 to 0° C., more preferably −35 to 0° C., particularly preferably −25 to −1° C. If the brittle temperature is too low, the obtained cross-linked product is liable to become higher in gasoline permeability. On the other hand, if too high, use of the obtained cross-linked product in a low temperature environment may become difficult.

Furthermore, the rubber cross-linked product of the present invention has a low gasoline permeability and further has a high sour gasoline resistance, so by making it into a hose comprised of one or more layers having a layer (I) comprised of the rubber cross-linked product of the present invention as at least one layer, preferably a hose comprised of a laminate of two or more layers having a layer (I) comprised of the rubber cross-linked product of the present invention as the inside layer, it can be suitably used as a fuel hose etc. Note that when a laminate of two or more layers, the layer (I) comprised of the rubber cross-linked product of the present invention may be used as any of an inside layer, intermediate layer, and outside layer. As the layer (II) forming the laminate other than the layer (I), a layer containing a nitrile copolymer rubber (L) with a content of α,β-ethylenically unsaturated nitrile monomer units of preferably 5 to 55 wt %, more preferably 18 to 45 wt %, and a plasticizer, with respect to the rubber (L) as 100 parts by weight, in preferably 0 to 100 parts by weight, more preferably 4 to 90 parts by weight, and having an brittle temperature of preferably −70 to −10° C., more preferably −60 to −14° C., particularly preferably −50 to −18° C., is preferred. Alternatively, one containing a nitrile copolymer rubber (L) and an acryl-based resin and/or vinyl chloride-based resin or a fluorine rubber, chloroprene rubber, hydrin rubber, chlorosulfonated polyethylene rubber, acryl rubber, ethylene-acrylate copolymer, ethylene-propylene copolymer, ethylene-propylene-diene ternary copolymer, butyl rubber, isoprene rubber, natural rubber, styrene-butadiene copolymer, fluorine resin, polyamide resin, polyvinyl alcohol, ethylene-vinyl acetate copolymer, ethylene-vinyl alcohol copolymer resin, polybutylene naphthalate, polyphenylene sulfide, polyolefin resin, polyester resin, etc. may be mentioned. These may be use alone or in combinations of a plurality of types.

Further, in accordance with need, to bond the layer (I) and the layer (II), it is possible to include a phosnium salt at one or both of the layer (I) and layer (II). It is also possible to use a new layer (III) as a bonding layer between the layer (I) and the layer (II). As the layer (III), it is possible to use a resin or rubber composition similar to the resin or rubber composition forming the above-mentioned layer (II). As the layer (III), it is possible to use the resin or rubber composition forming the above-mentioned layer (II) alone or in combinations of a plurality of types and possible to include a phosnium salt etc.

Here, the thickness of the layer (I) is preferably 0.1 to 10 mm, more preferably 0.5 to 5 mm. Further, when a laminate of two or more layers, the thickness of the layer (II) is preferably 0.1 to 10 mm, more preferably 0.5 to 5 mm. By using, instead of a thick rubber material comprised of only the material of the layer (I), a laminate comprised of the above layer (I) and layer (II) with an overall thickness similar to the above, it is possible to balance the low gasoline permeability of the layer (I) and the low brittle temperature characteristics of the layer (II) to a high degree. A multilayer hose comprised of this laminate having two or more layers having a layer (I) as an inner layer and a layer (II) as an outer side layer can be suitably used as a fuel hose.

Note that the method of producing a hose including the rubber cross-linked product of the present invention having the above configuration is not particularly limited, but the cross-linkable nitrile copolymer rubber composition of the present invention forming the hose of the present invention by using an extruder etc. to shape it into a tube and cross-linking this to thereby obtain the hose of the present invention has the property of being resistant to cracks in the mandrel, so a mandrel can be used for production.

That is, when making the hose a single layer one comprised of only the cross-linked product of the present invention, first the cross-linkable nitrile copolymer rubber composition of the present invention may be shaped into a tube, a mandrel inserted into the obtained tubular shaped article to fix it in shape, and the cross-linkable nitrile copolymer rubber composition cross-linked.

Alternatively, when making the hose a multiple layer one including the cross-linked product of the present invention, the cross-linkable nitrile copolymer rubber composition of the present invention and the resin or rubber composition forming the layers other than the layer comprised of the cross-linked product of the present invention may be laminated and shaped into a tube, a mandrel inserted into the obtained tubular shaped article to fix it in shape, and the cross-linkable nitrile copolymer rubber composition cross-linked.

Further, the rubber cross-linked product of the present invention is in addition suitable for packing, gaskets, O-rings, oil seals, and other seal members; oil hoses, fuel hoses, inlet hoses, gas hoses, brake hoses, coolant hoses, and other hoses. As the gas of the gas hoses, air, nitrogen, oxygen, hydrogen, carbon dioxide, carbon monoxide, methane, ethane, propane, dimethyl ether, LPG, etc. may be mentioned.

The latex compositions of the present invention (latex compositions I and II) not only give the nitrile copolymer rubber composition of the present invention, but are themselves useful as latex compositions for covering use. Note that when used as latex compositions for covering use, it is also possible to add a cross-linking agent similar to those explained above.

As the method for covering an object with rubber using the latex composition of the present invention, the dip molding method of dipping a ceramic, glass, metal, or other mold into a latex composition, raising it up, and heating and immobilizing the layer adhering to the surface; the roll impregnation method of impregnating a fiber with a latex composition, squeezing it by rolls etc., and heating and immobilizing it; the spray impregnation method of spraying a fiber with a latex composition and heating and immobilizing it; the coating method of coating the surface of an object to be coated with a latex composition and heating and immobilizing it; etc. may be mentioned.

When using the latex composition of the present invention for the dip molding method, the latex composition has a solids content concentration of preferably 15 to 40 wt %, more preferably 25 to 35 wt %. If the solids content is in this range, a dip molded article having a uniform thickness is easily obtained.

Further, when using the latex composition of the present invention for the roll impregnation method, the latex composition has a solids content concentration, while differing depending on the type of the fiber and target deposited amount, of preferably 5 to 30 wt %, more preferably 10 to 30 wt %. Impregnation of a fiber with a latex composition is affected by the surface tension of the latex composition, so the surface tension is preferably adjusted to 20 to 50 mN/m. As the method of adjusting the surface tension of the latex composition, the method of adding an anionic surfactant or a nonionic surfactant may be mentioned.

Furthermore, when using the latex composition of the present invention for the coating method, for example a paper or other base material is coated with the latex composition of the present invention using a coater, then dried by a hot air dryer to form a coated layer on the base material. As the coater, a blade coater, roll coater, curtain coater, rod coater, air knife coater, etc. may be mentioned. The optimal range of the solids content concentration of the latex composition differs depending on the coater, but is in general 10 to 60 wt %. As the drying condition after the coating, in general the temperature is about 100 to 170° C. and the time is several tens of seconds.

EXAMPLES

Below, reference examples, examples, and comparative examples will be given to specifically explain the present invention. Below, until particularly indicated, the "parts" are based on weight. Note that the tests and evaluation were conducted as follows:

(1) Method of Measurement of Isoelectric Point

Measured using microscope-type electrophoresis speed measurement system (Mark II electrophoresis speed measurement system made by Rank Brothers Ltd.).

(2) Contents of Acrylonitrile Monomer Units, 2-Vinyl Pyridine Monomer Units, and DMAPAA Monomer Units (wt %)

Found by FT NMR system (JNM-EX400WB) made by JEOL.

(3) Measurement of Crumb Size

First, 300 crumbs freely sampled from the coagulation tank were measured for crumb size. Note that when measuring the crumb size, since the crumbs are irregularly shaped, the sum of the largest diameter and smallest diameter of each crumbs divided by 2 was made the crumb size. Next, the interval between the largest value and smallest value of the crumb size was divided into 10 sections, the ratio of the number of crumbs contained in each section with respect to the total number of crumbs was calculated, and an integrated distribution curve was prepared. Further, from this integrated distribution curve, the median size (particle size corresponding to 50% of integrated distribution curve) was found and used as the crumb size of the sample.

(4) Polymer Mooney Viscosity ($ML_{1+4}$, 100° C.)

Measured by JIS K6300.

(5) Mooney Viscosity of Nitrile Copolymer Rubber Composition and Compound Mooney Viscosity ($ML_{1+4}$, 100° C.)

The Mooney viscosity of the nitrile copolymer rubber composition and the compound Mooney viscosity were measured in accordance with JIS K6300.

(6) Ordinary State Physical Properties (Tensile Strength, Elongation, 100% Tensile Stress)

A cross-linkable rubber composition was charged into a mold of a vertical 15 cm, horizontal 15 cm, and depth 0.2 cm and was press formed at 160° C. for 20 minutes while applying pressure to obtain a sheet-shaped rubber cross-linked product. The obtained sheet-shaped rubber cross-linked product was punched into JIS No. 3 dumbbell shapes to prepare test pieces. Further, these test pieces were used in accordance with JIS K6251 to measure the rubber cross-linked products for tensile strength, elongation, and 100% tensile stress.

(7) Ordinary State Physical Properties (Hardness)

Sheet-shaped rubber cross-linked products obtained in the same way as the (6) were measured in accordance with JIS K6253 using a durometer hardness tester type A to determine the hardness of the rubber cross-linked products.

(8) Gasoline Permeability

By the aluminum cup method using Fuel oil C (mixture of isooctane and toluene in a volume ratio of 1:1) and CE-20 (gasohol of mixture of fuel oil C and methanol in a volume ratio of 80:20), gasoline permeabilities were measured. The "aluminum cup method" places 50 ml of fuel oil C or CE-20 in a 100 ml volume aluminum cap, places a test piece obtained in the same way as the above (6) on the same, uses this to cover the cap, uses fasteners to adjust the area by which the test piece separates the inside and outside of the aluminum cap to 25.50 $cm^2$, allows the aluminum cup to stand in a 23° C. constant temperature tank, measures the weight every 24 hours so as to measure the amount of permeation of oil every 24 hours, and defines the maximum amount as the amount of permeation (unit: g·mm/$m^2$·day).

Note that, the smaller the amount of gasoline permeation, the better the gasoline permeability.

(9) Brittle Temperature (° C.)

A sheet-shaped rubber cross-linked product obtained in the same way as the (6) was measured in accordance with JIS K6301 for the brittle temperature.

(10) Immersion Test (Volume Change Ratio)

In accordance with JIS K6258, a test piece obtained in the same way as the above (6) was immersed in fuel oil C or CE-20 at 40° C. for 48 hours, and the change ratio in volume (unit:%) after immersion with respect to before immersion was measured.

(11) Ordinary State Ozone Test

The sheet-shaped rubber cross-linked product obtained in the same way as the above (6) was punched to obtain test pieces. In accordance with JIS K6259, the state after being left standing at 40° C., at an ozone concentration of 50 pphm, and a 206 elongation for 192 hours was evaluated. The results of the evaluation are shown next. That is, the results are expressed as NC (no cracks observed), B1, C2, etc. (alphabetical letters expressing extent of number of cracks with B being greater than A and C being greater than B. The larger the numerals, the larger the number of cracks), and CUT (sample broke). Note that, if "NC", it indicates superior ozone resistance.

(12) Sour Gasoline Resistance Test

A test piece obtained in the same way as the above (6) was immersed in 40° C. in test oil comprised of the fuel oil CE-20 in which dilauroyl peroxide was dissolved in a concentration of 3 wt %. After the elapse of 500 hours (test oil changed with a new one two times a week), the test piece was subjected to a tensile test according to JIS K6253 and was observed for any cracks at the time of elongation.

Reference Example 1

Production of Latex of Nitrile Copolymer Rubber
(n1)

A reaction vessel was charged with water in 240 parts, acrylonitrile 66.4 parts, 1,3-butadiene 8.2 parts, 2-vinyl pyridine 2.0 parts, and sodium dodecyl benzenesulfonate (emulsifier) 2.5 parts and the temperature was adjusted to 5° C.

Next, the vapor phase was reduced in pressure and sufficiently deaerated, then the polymerization initiator of p-menthane hydroperoxide in 0.06 part, sodium ethylene diamine tetraacetate 0.02 part, iron(II) sulfate (7 hydrate) 0.006 part, and sodium formaldehyde sulfoxylate 0.06 part, and the chain transfer agent of t-dodecyl mercaptan 1 part were added to start the first stage reaction of the emulsion polymerization. When the polymerization conversion rates with respect to the charged monomers reached 28 wt %, 47 wt %, 61 wt %, and 72 wt %, 1,3-butadiene was added to the reaction vessel in respective amounts of 6.9 parts, 6.3 parts, 5.5 parts, and 4.7 parts for the second, third, fourth, and fifth stage polymerization reactions. After that, when the polymerization conversion rate with respect to the total monomers charged reached 80 wt %, hydroxylamine sulfate 0.3 part and potassium hydroxide 0.2 part were added to make the polymerization reaction stop. Next, the content of the reaction vessel was warmed to 70° C. and the unreacted monomer was recovered by steam distillation under reduced pressure to obtain a latex of a nitrile copolymer rubber (n1) (solids content of 26 wt %). Note that, part of this latex was taken out and treated by the first half of the later explained Comparative Example 2 to obtain a solid rubber.

The obtained nitrile copolymer rubber (n1) had an acrylonitrile monomer unit content of 59.0 wt %, a 2-vinyl pyridine monomer unit content of 2.6 wt %, and a polymer Mooney viscosity ($ML_{1+4}$, 100° C.) of 83.0.

Further, the latex of the nitrile copolymer rubber (n1) had a pH of the isoelectric point of 2.6.

Reference Example 2

Production of Latex of Nitrile Copolymer Rubber (n2)

Except for making the monomers charged for the first stage of the emulsion polymerization in Reference Example 1 acrylonitrile 67.4 parts, 1,3-butadiene 7.7 parts, and N,N-dimethylaminopropylacrylamide (abbreviated as "DMAPAA") 1.5 parts, the same procedure was followed as in Reference Example 1 for a polymerization reaction to obtain a latex of a nitrile copolymer rubber (n2) (solids content of 26 wt %). The obtained nitrile copolymer rubber (n2) had an acrylonitrile monomer unit content of 59.0 wt %, a DMAPAA monomer unit content of 2.0 wt %, and a polymer Mooney viscosity ($ML_{1+4}$, 100° C.) of 81.0.

Further, the latex of the nitrile copolymer rubber (n2) had a pH at the isoelectric point of 2.7.

Reference Example 3

Production of Latex of Nitrile Copolymer (n3)

Except for making the monomers charged for the first stage of the emulsion polymerization in Reference Example 1 acrylonitrile 68.2 parts and 1,3-butadiene 8.4 parts, the same procedure was followed as in Reference Example 1 for a polymerization reaction to obtain a latex of a nitrile copolymer rubber (n3) (solids content of 26 wt %). The obtained nitrile copolymer rubber (n3) had a content of acrylonitrile monomer units of 58.6 wt %, a content of cationic monomer units and monomer units able to form cations of 0 wt %, and a polymer Mooney viscosity ($ML_{1+4}$, 100° C.) of 83.0.

Further, the latex of the nitrile copolymer rubber (n3) did not have an isoelectric point.

Example 1

The inorganic filler (clay) of refined montmorillonite (brandname "Kunipia F", made by Kunimine Industries) in 100 parts was added to distilled water in 1903.8 parts and vigorously stirred in the presence of 0.2 part of sodium polyacrylate to obtain an inorganic filler aqueous dispersion of a solids content concentration of 5% and a pH10.

Further, di(butoxyethoxyethyl)adipate (brandname "Adeka Sizer RS-107", made by Adeka Corporation, plasticizer) in a 50 wt % aqueous emulsion was prepared by mixing with vigorous stirring using potassium oleate as an emulsifier in an amount of 2 wt % of the plasticizer.

Further, while stirring a nitrile copolymer rubber (n1) latex in the vessel, the inorganic filler aqueous dispersion prepared as above containing an inorganic filler in 20 parts with respect to the solids content of the latex (amount of nitrile copolymer rubber) as 100 parts was added and dispersed to obtain a nitrile copolymer latex composition containing an inorganic filler with a solids content (nitrile copolymer rubber and inorganic filler) concentration of 15%. Next, the emulsion containing di(butoxyethoxyethyl)adipate prepared above (amount of plasticizer of 10 parts) in 20 parts was mixed in and made to disperse in obtained nitrile copolymer latex composition. The obtained dispersion was poured into an aqueous solution containing an amount of calcium chloride (coagulant) of 4% by weight with respect to the amount of the nitrile copolymer rubber in the dispersion and made to coagulate under stirring while suitably adding 10% dilute sulfuric acid to adjust the pH so that the pH of the aqueous solution during coagulation became a pH2.0 of the isoelectric point or less to thereby form crumbs comprised of a mixture of the nitrile copolymer rubber (n1), inorganic filler, and plasticizer (below, mixing the nitrile copolymer rubber, inorganic filler, and, in accordance with need, plasticizer in this procedure will be called "wet blending").

The obtained crumbs was filtrated, rinsed, then dried under reduced pressure at 60° C. to obtain the nitrile copolymer rubber composition. Note that the crumb size was 5 mm.

Further, the nitrile copolymer rubber composition had a Mooney viscosity ($ML_{1+4}$, 100° C.) of 106.

Next, a Bambury mixer was used, FEF carbon black (Seast SO, made by Tokai Carbon Co., LTD.) in 2 parts, the cross-linking aid of zinc white in 5 parts, and stearic acid in 1 part were added with respect to 100 parts of the nitrile copolymer rubber (n1) in the nitrile copolymer rubber composition and mixed at 50° C., then this mixture was transferred to a roll and kneaded with the cross-linking agent of 325 mesh sulfur in 0.5 part, tetramethyl thiuram disulfide (brand name "Noccelar TT", made by Ouchi Shinko Chemical Industrial) in 1.5 parts, and N-cyclohexyl-2-benzothiazolyl sulfenamide (brand name "Noccelar CZ", made by Ouchi Shinko Chemical Industrial, cross-linking accelerator) in 1.5 parts at 50° C. to prepare a compound (cross-linkable nitrile copolymer rubber composition).

The Mooney viscosity of the obtained compound and the ordinary state physical properties (tensile strength, elongation, 100% tensile stress, hardness), gasoline permeation test (fuel oil C, CE-20), brittle temperature, an immersion test (fuel oil C, CE-20), an ordinary state ozone test, and sour gasoline resistance of the rubber cross-linked product obtained by cross-linking that cross-linkable nitrile copolymer rubber composition were tested and evaluated. The results are shown in Table 1.

Example 2

Except for using a nitrile copolymer rubber (n2) latex instead of the nitrile copolymer rubber (n1) latex in Example 1, the same procedure was followed as in Example 1 to obtain a nitrile copolymer rubber composition comprised of a mixture of a nitrile copolymer rubber (n2), inorganic filler, and plasticizer. Note that, the obtained crumbs had a crumb size of 5 mm.

Further, the obtained nitrile copolymer rubber composition was used and the same procedure was followed as in Example 1 to prepare a compound (cross-linkable nitrile copolymer rubber composition). This was tested and evaluated in the same way as Example 1. The results are shown in Table 1.

Comparative Example 1

Except for using a nitrile copolymer rubber (n3) latex instead of the nitrile copolymer rubber (n1) latex in Example 1, the same procedure was followed as in Example 1 to obtain a mixture of a latex of nitrile copolymer rubber (n3), an inorganic filler dispersion, and a plasticizer emulsion (nitrile copolymer latex composition). However, in Comparative Example 1, even if the obtained mixture was coagulated by a method similar to Example 1, crumbs were not formed and the result became a powder state.

Further, the obtained powder aggregate (nitrile copolymer rubber composition) was used and the same procedure as in Example 1 was followed to prepare a compound (cross-linkable nitrile copolymer rubber composition). This was tested and evaluated in the same way as Example 1. The results are shown in Table 1.

Comparative Example 2

A nitrile copolymer rubber (n1) latex was poured into an aqueous solution containing calcium chloride (coagulant) in an amount of 4 wt % with respect to the solids content (amount of nitrile copolymer rubber) while stirring it to cause a polymer to coagulate. Next, this was obtained by filtration to recover crumbs. These were rinsed and dried under reduced pressure at 60° C. to obtain dried nitrile copolymer rubber (n1).

Next, a Bambury mixer was used to mix into this dry nitrile copolymer rubber (n1), as 100 parts, refined montmorillonite in 20 parts and di(butoxyethoxyethyl) adipate in 10 parts by a nonaqueous system (dry blending), then following the same procedure as in Example 1 to mix and knead FEF carbon black, a cross-linking aid, a cross-linking agent, and a cross-linking accelerator to prepare a compound (cross-linkable nitrile copolymer rubber composition). This was tested and evaluated in the same way as Example 1. The results are shown in Table 1.

TABLE 1

| | | | Ex. 1 | Ex. 2 | Comp. E.x. 1 | Comp. E.x. 2 |
|---|---|---|---|---|---|---|
| test/evaluation | Rubber | Type of rubber | n1 | n2 | n3 | n1 |
| | | Polymer Mooney viscosity ($ML_{1+4}$, 100° C.) | 83 | 81 | 83 | 83 |
| | Blend method | Wet blend or Dry blend | Wet | Wet | Wet | Dry |
| | Crumb forming ability | Crumb size (mm) | 5 | 5 | Powder | — |
| | Latex isoelectric point | Latex isoelectric point (pH) | 2.6 | 2.7 | — | 2.6 |
| | Nitrile copolymer rubber composition | Mooney viscosity of rubber composition ($ML_{1+4}$, 100° C.) | 106 | 100 | 101 | — |
| | Formulation for evaluation of properties | Rubber (note 1) | 100 | 100 | 100 | 100 |
| | | FEF carbon black (Seast SO) | 2 | 2 | 2 | 2 |
| | | Zinc White (ZnO#1) | 5 | 5 | 5 | 5 |
| | | Stearic acid | 1 | 1 | 1 | 1 |
| | | Sulfur (S#325) | 0.5 | 0.5 | 0.5 | 0.5 |
| | | Noccelar TT | 1.5 | 1.5 | 1.5 | 1.5 |
| | | Noccelar CZ | 1.5 | 1.5 | 1.5 | 1.5 |
| | Cross-linkable nitrile copolymer rubber composition | Compound Mooney viscosity ($ML_{1+4}$, 100° C.) | 100 | 95 | 95 | 95 |
| | Ordinary state physical properties (160° C. × 20 min) | Tensile strength (MPa) | 20.4 | 20.2 | 20.4 | 13.4 |
| | | Elongation (%) | 250 | 250 | 240 | 260 |
| | | 100% tensile stress (MPa) | 14.3 | 13.9 | 10.3 | 4.4 |
| | | Hardness (Duro-A) | 92 | 92 | 92 | 81 |
| | Gasoline permeation test | Fuel oil C (g · mm/m$^2$ · day) | 1 | 1 | 3 | 18 |
| | | CE-20 (g · mm/m$^2$ · day) | 55 | 57 | 65 | 113 |
| | Brittle test | Brittle temperature (° C.) | −2.8 | −2.6 | −1.6 | −2 |
| | Immersion test (volume change rate %) | Fuel oil C (isooctane/toluene = 50/50) | 12 | 11.9 | 12.6 | 13.0 |
| | | CE-20 (Fuel-C/methanol = 80/20) | 46.1 | 46.5 | 47.2 | 49.2 |
| | Ordinary state ozone test | 24 hr | NC | NC | NC | NC |
| | | 48 hr | A2 | A2 | A2 | A2 |
| | | 72 hr | A3 | A3 | A3 | A3 |
| | | 144 hr | B3 | B3 | B3 | C3 |
| | | 168 hr | B3 | B3 | B3 | C4 |
| | | 216 hr | B3 | B3 | B3 | CUT |
| | Sour gasoline resistance test | Crack | None | None | None | None |

(Note 1) Shows parts of use of net weight rubber excluding inorganic filler and plasticizer.

As shown in Table 1, when using a nitrile copolymer rubber composition obtained by coagulation of a nitrile copolymer latex composition comprised of a latex of a nitrile copolymer rubber having an extremely high nitrile content (α,β-ethylenically unsaturated nitrile monomer units of 55 to 80 wt %) and having monomer units able to form cations such as 2-vinyl pyridine or DMAPAA into which clay as an inorganic filler and a plasticizer are dispersed, the obtained rubber cross-linked product had sufficient ordinary state physical properties and suitable brittle temperatures, had extremely low gasoline permeabilities, small swelling in fuel immersion, and superior sour gasoline resistances (Examples 1 and 2).

As opposed to this, when using a latex of a nitrile copolymer rubber not having either of cationic monomer units and monomer units able to form cations, but having an equivalent nitrile content (extremely high nitrile content), a powder results and no crumbs are formed at the time of coagulation, this could not be recovered by a 20 mesh metal net, and the productivity was inferior. Furthermore, the rubber cross-linked product obtained using this powder nitrile copolymer rubber composition had an extremely large gasoline permeability (Comparative Example 1).

Further, if mixing the same ingredients as in Example 1 in a nonaqueous system (dry blend) to prepare a compound, the obtained rubber cross-linked product had an extremely large gasoline permeability (Comparative Example 2).

The invention claimed is:

1. A nitrile copolymer latex composition comprising a latex of a nitrile copolymer rubber (A) having α,β-ethylenically unsaturated nitrile monomer units in 55 to 80 wt % and cationic monomer units and/or monomer units able to form cations into which clay and a plasticizer with an SP value by the HOY method of 8 to 10.2 $(cal/cm^3)^{1/2}$ are dispersed.

2. The nitrile copolymer latex composition as set forth in claim 1, wherein said plasticizer is an ester compound of adipic acid and an ether-bond containing alcohol.

3. The nitrile copolymer latex composition as set forth in claim 1, wherein a ratio of content of said cationic monomer units and/or monomer units able to form cations in said nitrile copolymer rubber (A) is 0.1 to 15 wt %.

4. The nitrile copolymer latex composition as set forth in claim 1, wherein a ratio of said clay with respect to said nitrile copolymer rubber (A) as 100 parts by weight is 1 to 200 parts by weight.

5. The nitrile copolymer latex composition as set forth in claim 1, wherein said nitrile copolymer rubber (A) further has diene monomer units and/or α-olefin monomer units, and a ratio of content of said diene monomer units and/or α-olefin monomer units in said nitrile copolymer rubber (A) is 5 to 44.9 wt %.

6. A nitrile copolymer rubber composition obtained by coagulation of the nitrile copolymer latex composition as set forth in claim 1.

7. A cross-linkable nitrile copolymer rubber composition comprised of the nitrile copolymer rubber composition as set forth in claim 6 to which a cross-linking agent is added.

8. A rubber cross-linked product obtained by cross-linking the cross-linkable nitrile copolymer rubber composition as set forth in claim 7.

9. A laminate comprised of two or more layers wherein at least one layer is comprised of the rubber cross-linked product as set forth in claim 8.

10. A hose obtained by shaping the cross-linkable nitrile copolymer rubber composition as set forth in claim 7 into a tube shape, inserting a mandrel, and cross-linking the obtained shaped article.

11. A hose obtained by shaping a laminate of two or more layers including a layer comprised of the cross-linkable nitrile copolymer rubber composition as set forth in claim 7 into a tube shape, inserting a mandrel, and cross-linking the obtained shaped article.

12. The nitrile copolymer rubber composition as set forth in claim 6, obtained by coagulation of said nitrile copolymer latex composition to control the pH of a coagulant aqueous solution to the isoelectric point or less of said nitrile copolymer latex composition.

13. The nitrile copolymer latex composition as set forth in claim 2, wherein a ratio of said clay with respect to said nitrile copolymer rubber (A) as 100 parts by weight is 1 to 200 parts by weight.

14. The nitrile copolymer latex composition as set forth in claim 3, wherein a ratio of said clay with respect to said nitrile copolymer rubber (A) as 100 parts by weight is 1 to 200 parts by weight.

15. The nitrile copolymer latex composition as set forth in claim 1, wherein the clay has a flat particle shape.

* * * * *